(12) United States Patent
Reed

(10) Patent No.: US 6,585,201 B1
(45) Date of Patent: Jul. 1, 2003

(54) DETACHABLE UNIVERSAL DISPLAY MOUNT

(76) Inventor: Gregory Reed, 206 Boone Dr., Summerville, SC (US) 29485

( * ) Notice: Subject to any disclaimer, the term of this patent is extended or adjusted under 35 U.S.C. 154(b) by 0 days.

(21) Appl. No.: 10/094,180

(22) Filed: Mar. 8, 2002

(51) Int. Cl.[7] .............................................. F16M 11/02
(52) U.S. Cl. .................................... 248/181.1; 248/917
(58) Field of Search ........................... 248/181.1, 181.2, 248/278.1, 279.1, 288.31, 161, 125.8, 122.1, 917, 921, 922, 923, 924; 224/553

(56) References Cited

U.S. PATENT DOCUMENTS

| | | | | |
|---|---|---|---|---|
| 4,097,012 A | * | 6/1978 | McIntyre | 248/674 |
| 4,278,223 A | * | 7/1981 | Fauteux | 248/125.8 |
| 4,660,791 A | * | 4/1987 | Lisak | 248/122.1 |
| 5,673,628 A | * | 10/1997 | Boos | 108/44 |
| 5,845,885 A | * | 12/1998 | Carnevali | 248/181.1 |
| 6,168,126 B1 | * | 1/2001 | Stafford | 248/276.1 |
| 6,315,259 B1 | * | 11/2001 | Kolb | 248/276.1 |
| 6,386,413 B1 | * | 5/2002 | Twyford | 224/553 |

* cited by examiner

Primary Examiner—Ramon O. Ramirez

(57) ABSTRACT

A detachable universal display mount to be used for front or rear seat viewing of displays or other information management devices while in a vehicle. The mount has unique telescoping and pivot features that allow for perfect straight-on viewing of the devices on the mount without excessive sun glare. The pivot feature further enables storage of the mount in either a horizontal or vertical position. The mount can be used on a free-standing base or attached to a wall of the vehicle and is completely detachable so that the mounted device may be removed and stored out of sight.

10 Claims, 4 Drawing Sheets

DETACHABLE UNIVERSAL DISPLAY MOUNT

BACKGROUND OF THE INVENTION

1. Field of the Invention

The present invention relates to a detachable display mount for use in connection with a motor vehicle The detachable universal mount has particular utility in connection with the front or rear seat viewing of flat displays, such as liquid crystal displays (LCDs), or other information management devices in a motor vehicle by uniquely telescoping in and out for a perfect viewing height and pivoting to allow for a direct in front view and storage at a vertical or horizontal position while also having a bracket that makes the mount detachable so that a display may be removed from the vehicle with ease at any time.

2. Description of the Prior Art

Detachable universal display mounts are desirable for both front and rear seat in-vehicle viewing of mobile LCD displays, laptop computers, PDA's and GPS receivers and other electronic portable devices.

The use of an apparatus for attaching a display monitor to a seat is known in the prior art. For example, U.S. Pat. No. 5,000,511 to Shichijo, et al., discloses a display that is attached to a reclining seat back by an arm pivotally fixed at an end to the seat back. However, the Shichijo '511 patent does not allow for a free-standing mount or attachment to the wall of a vehicle and requires that the display attachment is affixed to the seat, and has further drawbacks of requiring storage in the recesses of the seats when not in use rather than laying flat for storage.

U.S. Pat. No. 5,374,104 to Moore and Kirk discloses an armrest with a video deployment system that describes an armrest that has a deployment arm for extending a video device from inside the armrest to its viewing position. However, the Moore '104 patent does not permit easy detachment from its in-use position, and additionally does not function independently as an LCD device display unit that can be used with the existing seating arrangement, but instead requires the installation of an entirely new armrest for its use.

Similarly, U.S. Pat. No. 4,703,972 to Omberg discloses a rear seat automobile sun-visor mirror assembly that allows sun-shade protection or rear viewing for a rear seat automobile passenger. However, the Omberg '972 patent does not provide for front seat use, and can not function as a mobile LCD or other information management device display.

Additionally, U.S. Pat. No. 4,705,274 to Lubeck discloses a retractable seat for attachment to gaming devices. However, the Lubeck '274 patent fails to telescope and pivot in order to achieve a perfect viewing height and further could not be used in both the front and rear seat compartments of a vehicle. Additionally, incorporation of the device as a component of the seat creates heat in the seat.

Lastly, U.S. Pat. No. 5,668, 570 to Ditzik discloses a desktop computer/workstation with an adjustable flat panel screen provides an ergonomic man to machine interface while using an information communication network on a desk or table top. However, the Ditzik '570 patent is a desktop unit and does not attach to the front and rear seat areas of an automobile, and has the additional deficiency of not providing a telescoping feature that allows to establish a perfect viewing height.

While the above-described devices fulfill their respective, particular objectives and requirements, the aforementioned patents do not describe a detachable universal display mount that allows for front or rear viewing of a variety of displays or other information management devices in a motor vehicle by uniquely telescoping in and out for a perfect viewing height and pivoting to allow for a direct in front view and storage at a vertical or horizontal position while also having a bracket that makes the mount detachable so that a display device may be removed from the vehicle with ease at any time. The prior art patents and other devices commonly known in the art make no provision for being detachable and having a telescoping and pivoting features so that the mount may establish a perfect viewing height, nor does the prior art allow for both front and rear seat usage.

Therefore, a need exists for a new and improved detachable universal display mount that can be used for the front or rear viewing of a variety of displays or other information management devices in a motor vehicle by uniquely telescoping in and out for a perfect viewing height and pivoting to allow for a direct in front view and storage at a vertical or horizontal position while also having a bracket that makes the mount detachable so that a display device may be removed from the vehicle with ease at any time. In this regard, the present invention substantially fulfills this need. In this respect, the detachable universal display mount according to the present invention substantially departs from the conventional concepts and designs of the prior art, and in doing so provides an apparatus primarily developed for the purpose of the front or rear viewing of a variety of displays or other information management devices in a motor vehicle by uniquely telescoping in and out for a perfect viewing height and pivoting to allow for a direct in front view and storage at a vertical or horizontal position while also having a bracket that makes the mount detachable so that a display device may be removed from the vehicle with ease at any time.

SUMMARY OF THE INVENTION

In view of the foregoing disadvantages inherent in the known types of display device mounts now present in the prior art, the present invention provides an improved detachable universal display mount, and overcomes the above-mentioned disadvantages and drawbacks of the prior art. As such, the general purpose of the present invention, which will be described subsequently in greater detail, is to provide a new and improved detachable universal display mount and method of providing for the front or rear viewing of a variety of displays or other information management devices in a motor vehicle by uniquely telescoping in and out for a perfect viewing height and pivoting to allow for a direct in front view and storage at a vertical or horizontal position while also having a bracket that makes the mount detachable so that a display device may be removed from the vehicle with ease at any time which has all the advantages of the prior art mentioned heretofore and many novel features that result in a detachable universal display mount which is not anticipated, rendered obvious, suggested, or even implied by the prior art, either alone or in any combination thereof.

To attain this, the present invention essentially comprises a hollow telescoping tube support of up to three sections affixed to a height and width adjustable hinged mounting plate and bracket assembly, wherein the hollow telescoping tube support is attached with a pivot ball joint to a self-supporting base or a wall mount unit, allowing the invention to be used in the front or rear compartment of a vehicle.

There has thus been outlined, rather broadly, the more important features of the invention in order that the detailed description thereof that follows may be better understood and in order that the present contribution to the art may be better appreciated.

The invention may also include a self-supporting base or a wall mount for attaching the display device to the interior compartment of a vehicle. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved detachable universal display mount that has all of the advantages of the prior art display mount devices and none of the disadvantages.

It is another object of the present invention to provide a new and improved detachable universal display mount that may be easily and efficiently manufactured and marketed.

An even further object of the present invention is to provide a new and improved detachable universal display mount that has a low cost of manufacture with regard to both materials and labor, and which accordingly is then susceptible of low prices of sale to the consuming public, thereby making such detachable universal display mount economically available to the buying public.

Still another object of the present invention is to provide a new detachable universal display mount that provides in the apparatuses and methods of the prior art some of the advantages thereof, while simultaneously overcoming some of the disadvantages normally associated therewith.

Even still another object of the present invention is to provide a detachable universal display mount for the front or rear viewing of a variety of displays or other information management devices in a motor vehicle by uniquely telescoping in and out and pivoting to allow for a direct in front view and storage at a vertical or horizontal position with a lock-down clip while also having a bracket that makes the mount detachable so that a display device may be removed from the vehicle with ease at any time.

This allows for a perfect viewing height by providing a direct in front view for a front-seat occupant who is using the invention to view a display.

The detachable universal display mount also provides for a self-supporting base mount or a wall mount for affixing the detachable universal display mount to a vehicle.

Lastly, it is an object of the present invention to provide a new and improved method of viewing a mobile display mount in both the front and rear compartments of a vehicle by using a display device that telescopes towards or away from the viewer to allow for a perfect viewing height without requiring any tilting and also pivoting to allow for storage of the mount in either a horizontal or vertical position with a lock-down clip.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
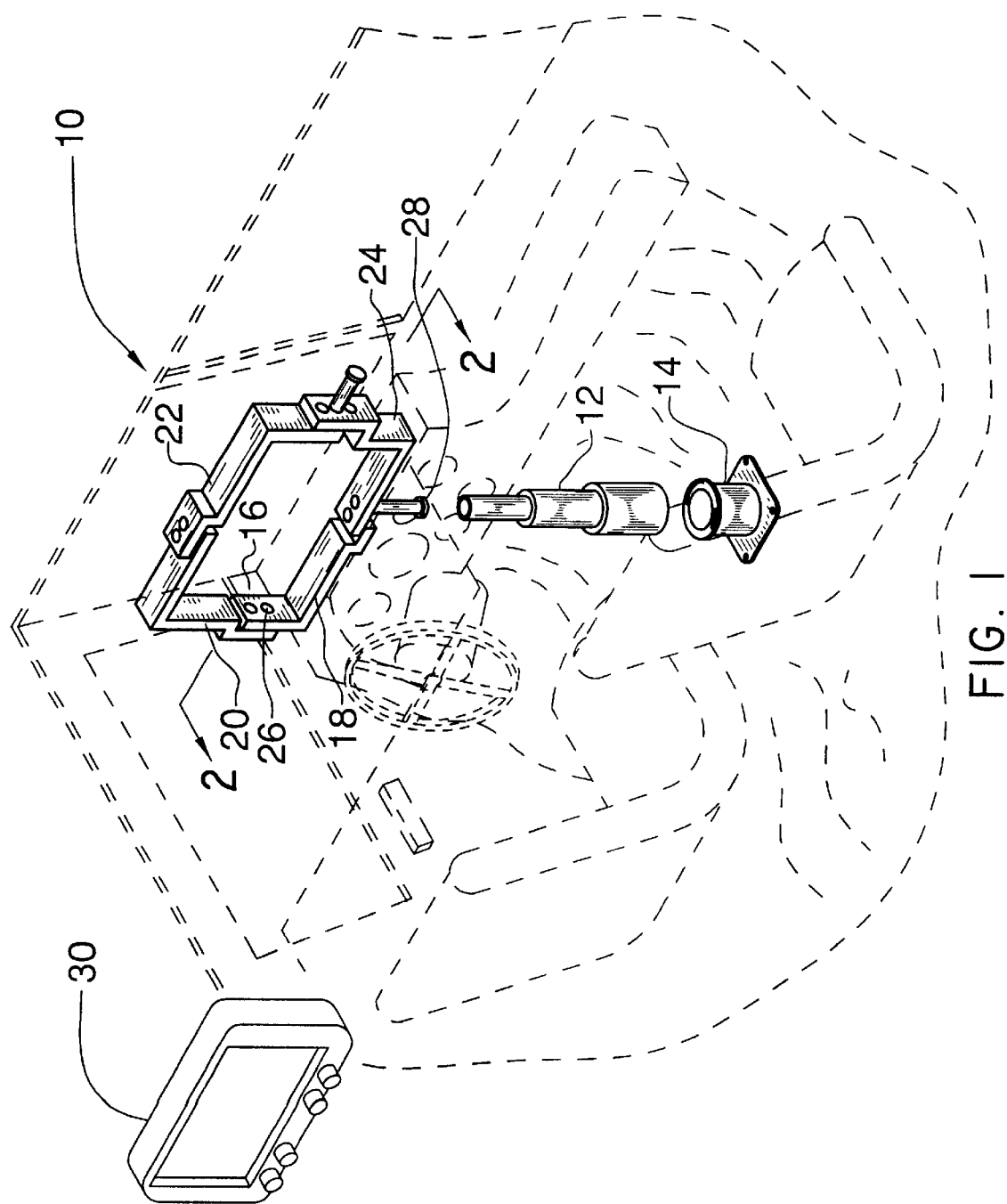
FIG. 1 is a front elevational view of the current embodiment of the detachable universal LCD mount with a self-supporting base constructed in accordance with the principles of the present invention.

Referring now to the drawings, and particularly to FIGS. 1–4, a current embodiment of the detachable universal LCD mount of the present invention is shown and generally designated by the reference numeral 10.

In FIG. 1, a new and improved detachable universal display mount 10 of the present invention for the front or rear viewing of a variety of displays, such as LCDs, or other information management devices in a motor vehicle by uniquely telescoping in and out for a perfect viewing height and pivoting to allow for a direct in front view and storage at a vertical or horizontal position while also having a bracket that makes the mount detachable so that a display device may be removed from the vehicle with ease at any time is illustrated and will be described. The current embodiment depicts the use of the detachable universal display mount in the front seat of a vehicle. More particularly, the detachable universal display mount 10 has a hollow and adjustable three-section telescoping tube support 12 that is attached to a self-supporting base 14. The hollow adjustable three-section telescoping tube support 12 telescopes in and out to provide for a perfect viewing height. Furthermore, the hollow adjustable three-section telescoping tube support 12 is affixed at its distal end to the hollow self-supporting base 14 and at its proximate end to a frame 16 that has a first frame piece 18, a second frame piece 20, a third frame piece 22 and a fourth frame piece 24. Each frame piece has at least two holes 26. The fourth piece has a post 28 on its outer sides that allow it to be attached to hollow adjustable three-section 12. The frame 16 is that are width and height adjustable to secure a mobile display device 30 that measures 4 inches to 12 inches horizontally to 3 inches to 8 inches vertically.

Figure 2:
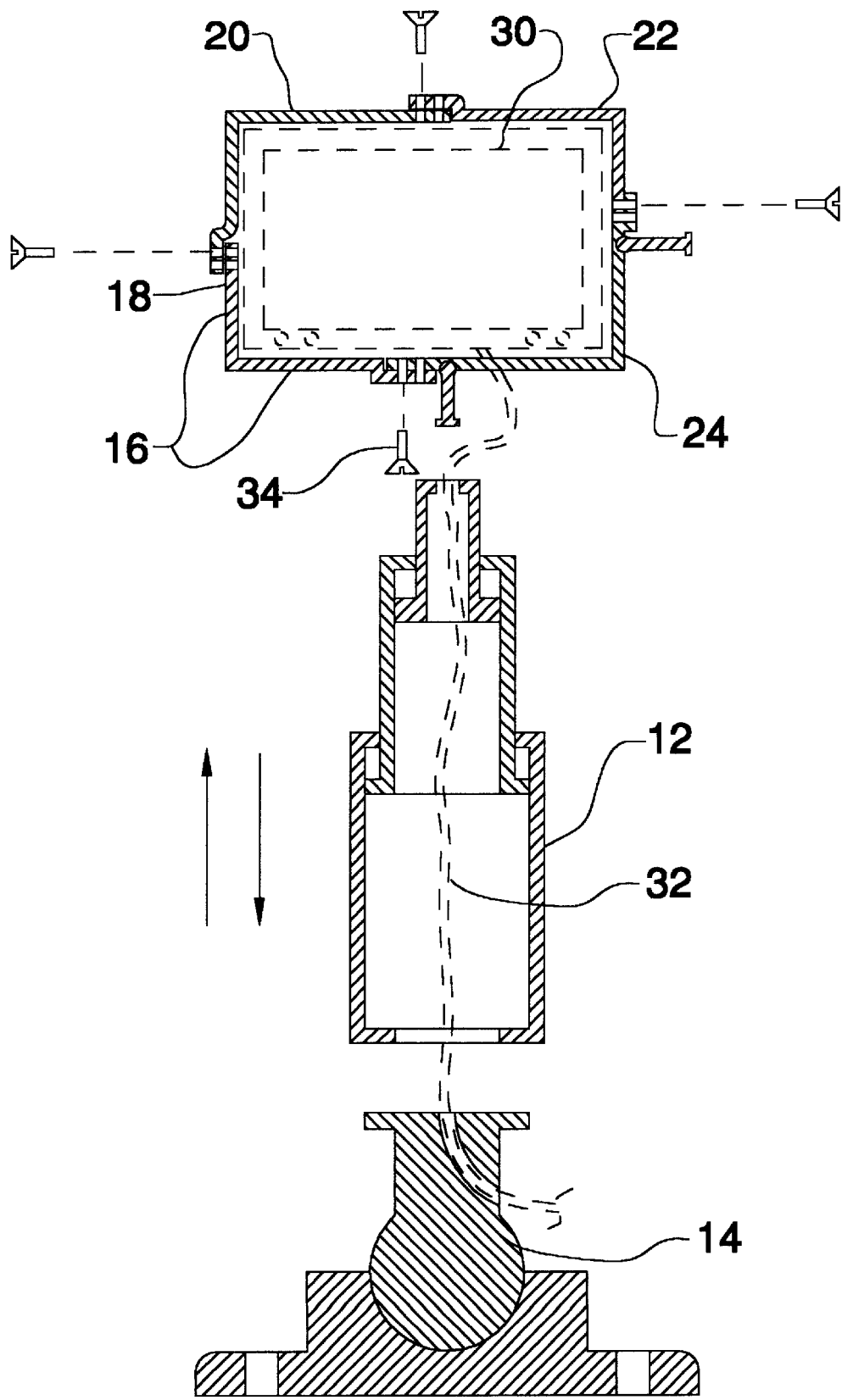
FIG. 2 is a side cross-sectional view of the detachable universal display mount of the present invention.

FIG. 2 illustrates a front elevation view of the new and improved detachable universal LCD mount wherein the rotatable base 14 is affixed to the hollow adjustable three-section telescoping tube support 12 with an LCD display cable 32 running to the universal display 30 through the hollow adjustable three-section telescoping tube support 12 and the rotatable base 14. As shown, the hollow adjustable three-section telescoping tube support 12 is affixed at its distal end to the hollow self-supporting base 14 and at its proximate end to the fourth piece 24 of the frame 16 by a post 28. A universal display 30 is mounted on the frame 16 and secured in place by screws 34 on the first frame piece 18, the second frame piece 20, the third frame piece 22 and the fourth frame piece 24 that comprise the frame 16. The first frame piece 18, second frame piece 20, third frame piece 22 and fourth frame piece 24 are angular, width, and height adjustable to secure the universal display device 30 that measures 4 inches to 12 inches horizontally to 3 inches to 8 inches vertically while providing a straight-on, in-front view of the universal display device 30.

Figure 3:
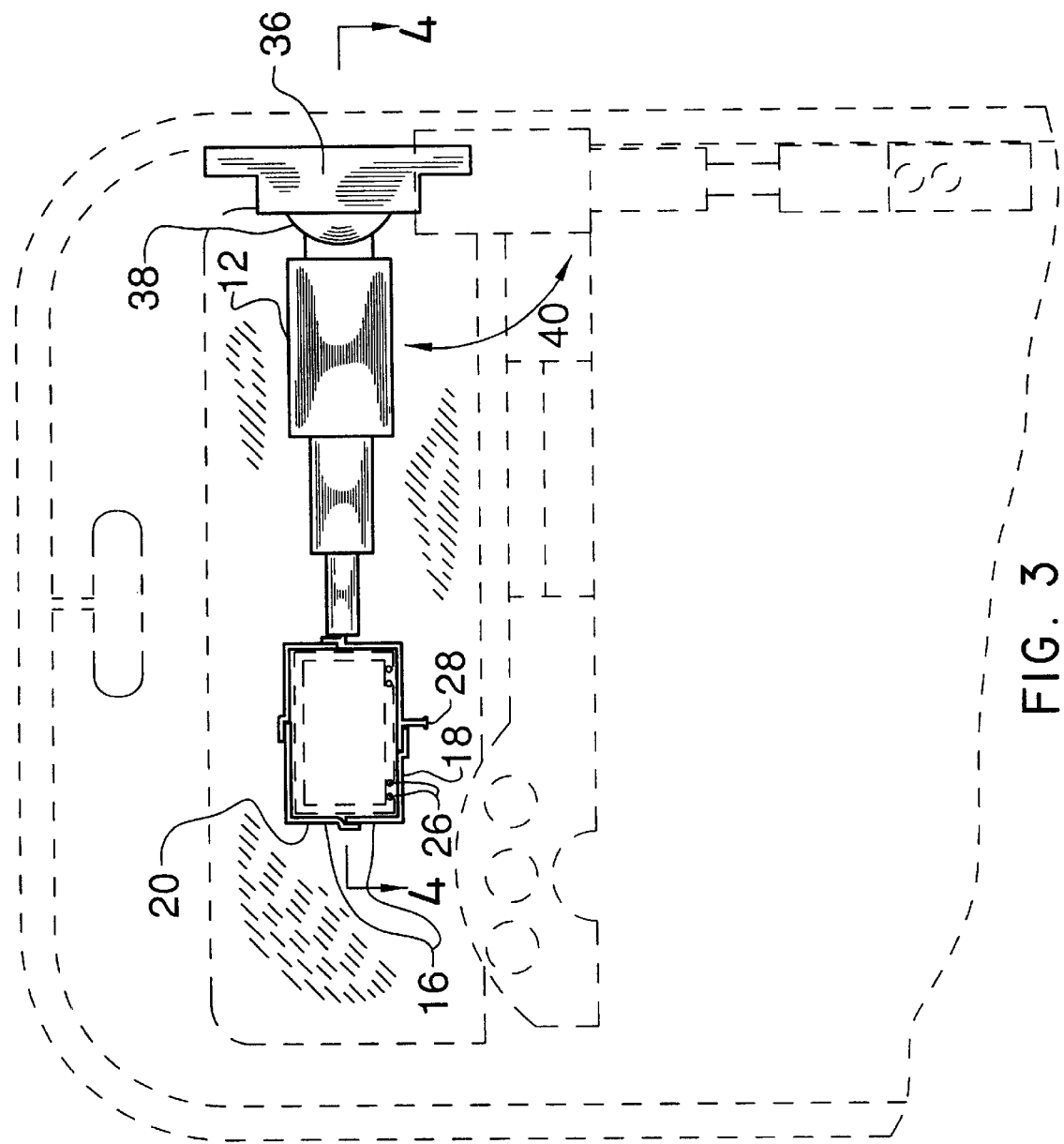
FIG. 3 is a front elevational view of the detachable universal display mount with a wall-mount of the present invention.

Another current embodiment is shown in FIG. 3. In this embodiment, a wall mount 36 is provided to affix the detachable universal mount to a wall of a vehicle. The wall mount is attached to a ball-joint pivot unit 38 that allows for a straight-on, in-front view of the universal display device 30 and further permits the detachable universal LCD mount to be stored in either a horizontal position as shown or a vertical position wherein the frame 16 is attached to the proximate end of the hollow adjustable three-section telescoping tube support also having a distal end in its vertical position. The ball-joint pivot unit 38 is affixed to the hollow adjustable three-section telescoping tube support 12 that is attached to the fourth frame piece 24 by a post 28 incorporated onto the fourth frame. The frame 16 is angular, width, and height adjustable for secure a universal display device 30 that measures 4 inches to 12 inches horizontally to 3 inches to 8 inches vertically while providing a straight-on, in-front view of the universal display device 30. The universal display 30 is mounted on the frame 16 and secured in place by screws 34 that support the display on the first frame piece 18, the second frame piece 20, the third frame piece 22 and the fourth frame piece 24 that comprise the frame 16.

Figure 4:
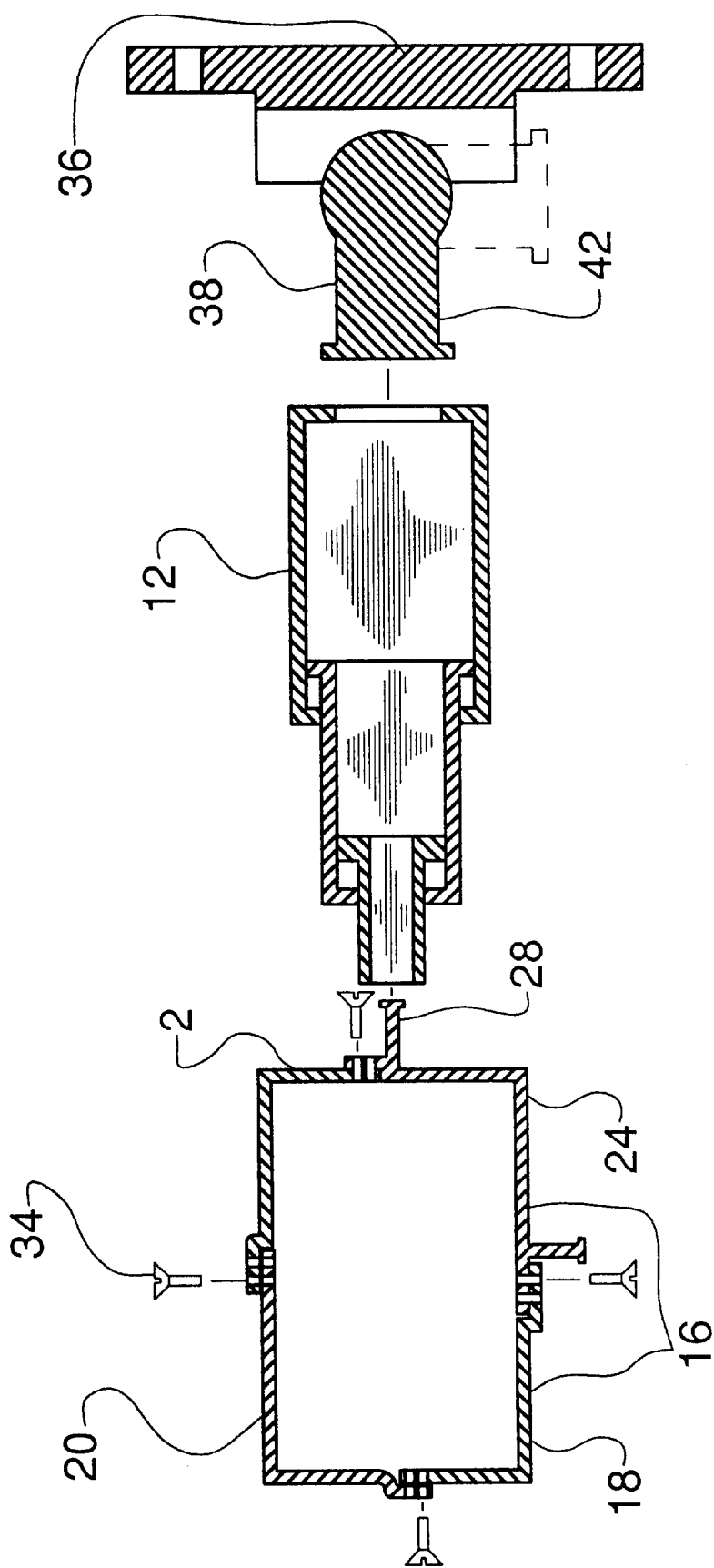
FIG. 4 is a side cross-sectional view of the detachable universal display mount with a wall-mount of the present invention.

A side cross-sectional view of the embodiment is shown in FIG. 4. The wall mount 36 is attached to a ball-joint pivot unit 38 that allows for a straight-on, in-front view of the universal display and further permits the invention to be stored in either a vertical or horizontal position. The ball-joint pivot unit 38 is affixed to the distal end of the hollow adjustable three-section telescoping tube support 12. The hollow adjustable three-section telescoping tube support 12 that is further attached at its proximate end to the fourth frame piece 24 by a post 28 incorporated onto the fourth frame piece. The frame 16 is angular, width, and height adjustable for secure a universal display device 30 which is mounted on the frame 16 and secured in place by screws 34 that support the display on the first frame piece 18, the second frame piece 20, the third frame piece 22 and the fourth frame piece 24 that comprise the frame 16. The ball-joint pivot unit 38 is able to rotate on an axis 42 in order to adjust the display unit to a perfect height and angle for viewing and to allow for storage in either a vertical or horizontal position.

In use, it can now be understood that the detachable universal display mount would fulfill the need for a useful in-vehicle mount for using mobile LCD displays or other portable electronic devices in motor vehicles. The appealing features of the detachable universal display mount would be its all-metal construction combined with the selected positioning height and base plate configuration that would offer the operator of a motor vehicle a stable platform for using a selected portable electronic device while not having to take his or her eyes off of the road.

While a current embodiment of the detachable universal display mount has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy, but lightweight material such as a metal, plastic, or a variety of wood or combination thereof may be used instead of the all-metal construction described. Also, the telescoping metal arm may also be made of a suitable sturdy, lightweight material such as metal, heavy-duty plastic, wood, or similar material and may be comprised of two or three telescoping pieces. And although a display mount has been described, it should be appreciated that the display holder described herein is also suitable for mounting a variety of portable electronic devices including, but not limited to, video cassette recorders, DVDs, electronic games, and navigation systems and also useable in an array of vehicles including but not limited to boats and airplanes.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A display holder comprising:
   a mounting base;
   a frame for holding a display, wherein said frame is rectangular and comprises a first frame piece, a second frame piece, a third frame piece and a fourth frame piece, wherein said first frame piece is attached to said second frame piece, said second frame piece is attached to said third frame piece, said third frame piece is attached to said fourth frame piece, and said fourth frame piece is attached to said first frame piece; and
   a support arm having a distal and proximate end, wherein said proximate end is attached to said frame and said distal end is attached to said mounting base.

2. The display holder of claim 1 wherein said first frame piece, said second frame piece, said third frame piece and said fourth frame piece each have two attachment holes therein.

3. The display holder of claim 2 wherein a display unit is secured to said first frame piece, said second frame piece, said third frame piece and said fourth frame piece by screws.

4. A display holder as in claim 1 wherein said frame is attached to said support arm by a post on said fourth frame piece.

5. A display holder comprising:
- a mounting base, wherein said mounting base is rotatable and comprises a wall mount;
- a frame for holding a display, wherein said frame is rectangular and comprises a first frame piece, a second frame piece, a third frame piece and a fourth frame piece each comprising two holes therein, wherein said first frame piece is attached to said second frame piece, said second frame piece is attached to said third frame piece, said third frame piece is attached to said fourth frame piece, and said fourth frame piece is attached to said first frame piece;
- a ball-joint pivot unit; and
- a support arm having a distal and proximate end, wherein said proximate end is attached to said frame and said distal end is pivotally connected by said ball-joint pivot unit to said mounting base.

6. A display holder as in claim 5 wherein said frame is attached to said support arm by a post on said fourth frame piece.

7. The display holder of claim 5 wherein a display unit is secured to each of said first frame piece, said second frame piece, said third frame piece and said fourth frame piece by screws.

8. A display holder comprising:
- a mounting base, wherein said mounting base is rotatable and free-standing;
- a frame for holding a display, wherein said frame is rectangular and comprises a first frame piece, a second frame piece, a third frame piece and a fourth frame piece, each having two holes wherein said first frame piece is attached to said second frame piece, said second frame piece is attached to said third frame piece, said third frame piece is attached to said fourth frame piece, and said fourth frame piece is attached to said first frame piece, by screws; and
- a support arm having a distal and proximate end, wherein said support arm is telescoping and comprised of at least three sections, wherein said sections are hollow and collapsible;
- wherein said distal end is connected to said mounting base and said proximate end is attached to said frame.

9. A display holder as in claim 8 wherein said frame is attached to said support arm by a post on said fourth frame piece.

10. The display holder of claim 8 wherein a display unit is secured to each of said first frame piece, said second frame piece, said third frame piece and said fourth frame piece by screws.

* * * * *